Aug. 19, 1952  G. BAECHLI  2,607,471
SHAKER CONVEYER LOADING APPARATUS
Filed Dec. 9, 1948  2 SHEETS—SHEET 1
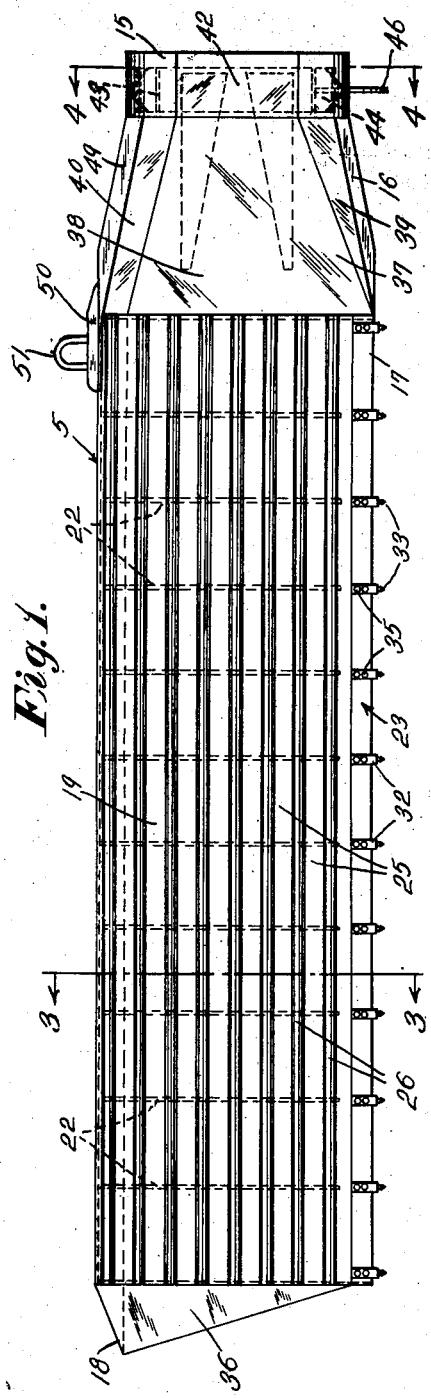
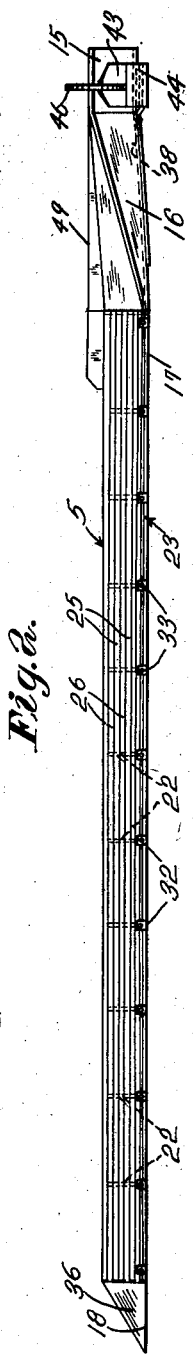
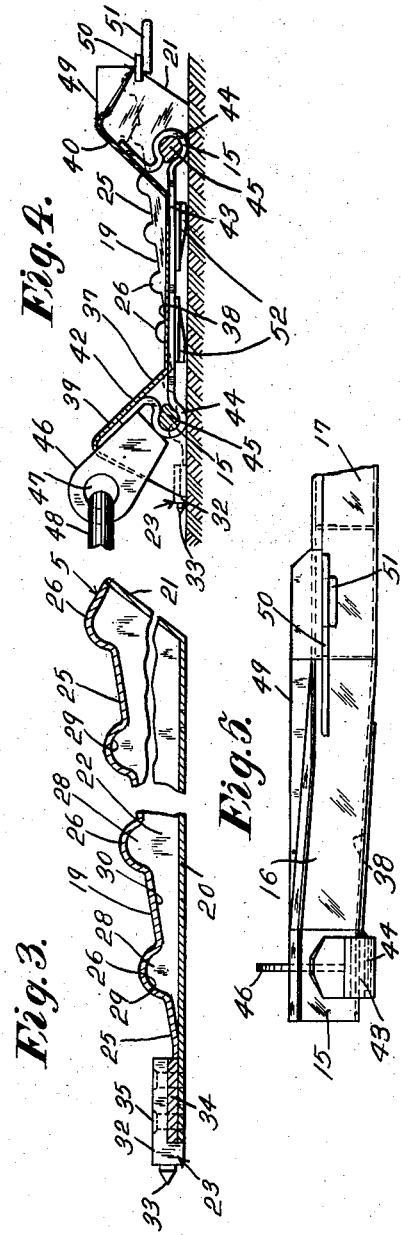
Inventor:
George Baechli.
Attorney.

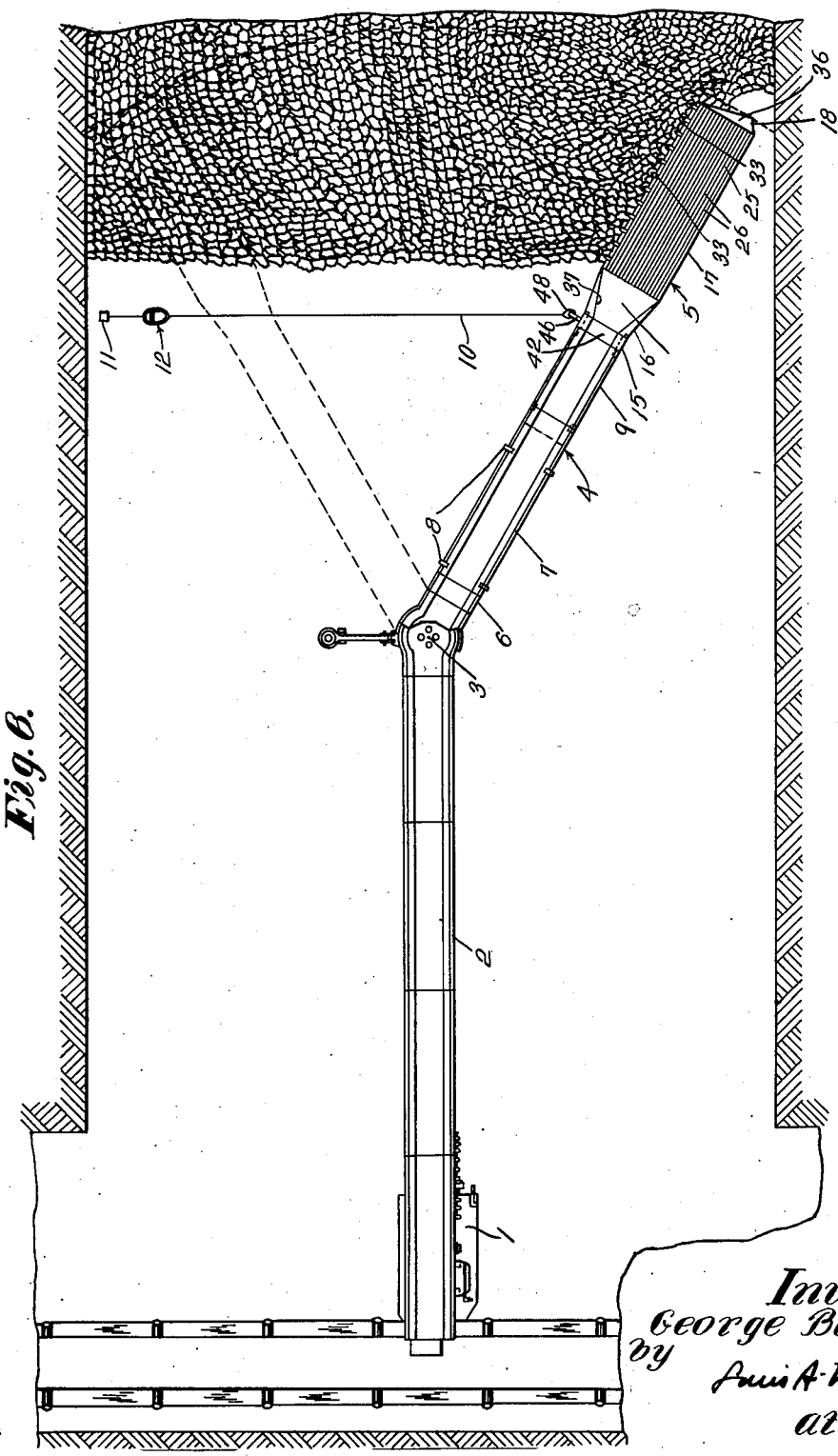

Patented Aug. 19, 1952

2,607,471

UNITED STATES PATENT OFFICE 2,607,471

SHAKER CONVEYER LOADING APPARATUS

George Baechli, New Philadelphia, Ohio, assignor to Joy Manufacturing Company, Pittsburgh, Pa., a corporation of Pennsylvania Application December 9, 1948, Serial No. 64,358

14 Claims. (Cl. 198—220)

My invention relates to shaker conveyors, and more particularly to loading devices operated by movement of the reciprocatory type which characterizes shaker conveyors.

Various devices operated by the reciprocatory movement imparted to them by a pan line have been provided for effecting the delivery of material to a pan line for loading out by the latter. Among such devices there are those which are adapted to be reciprocated longitudinally and to be moved bodily laterally with respect to the direction of their path of reciprocatory movement, to load out material, for example, shot coal, which has been shot down upon them or which may otherwise be caused to rest upon them.

It is an object of my invention to provide an improved loading apparatus of the character mentioned, having a stronger construction, a more effective arrangement for preventing the escape across it of the material which it is intended to load out, and improved means for enabling it to maintain its position under, and to work its way beneath, a mass of shot coal.

More specifically my invention has for one of its objects the provision of an improved loading head or pan. Another object of my invention is to provide an improved loading pan or head having improved means for preventing the escape of material off of the receding edge thereof. A further object of my invention is to provide an improved loading head or pan having improved means for reinforcing the same to prevent crushing thereof. Yet another object of my invention is the provision of an improved loading device for a shaker conveyor comprising an elongated, longitudinally reciprocable member having an inclined top surface in the form of a plurality of alternating crests and valleys extending in the direction of longitudinal reciprocation and having a bottom having engagement with a supporting surface in a plane making an acute angle with the plane which contacts the tops of the crests of the upper surface of said member. Still another object of my invention is to provide an improved loading pan or head having an improved construction at the forward end thereof, speaking in terms of the direction of reciprocation of such pan by a pan line. Still another object of my invention is to provide an improved loading head or pan having an improved arrangement of reinforcing elements and elements constituting means for facilitating material penetration by the leading edge thereof. Other objects and advantages of my invention will hereinafter more fully appear.

In the accompanying drawings there is shown for purposes of illustration one form which the invention may assume in practice.

In these drawings:

Fig. 1 is a plan view of an improved loading device constructed in accordance with a preferred embodiment of my invention.

Fig. 2 is a side elevational view, from the leading edge thereof, of the improved loading device shown in Fig. 1.

Fig. 3 is an enlarged transverse sectional view taken on the plane of the line 3—3 of Fig. 1.

Fig. 4 is another enlarged transverse sectional view, this one taken on the line 4—4 of Fig. 1.

Fig. 5 is a side elevational view, on an enlarged scale, of the troughlike connecting end of the loading head or pan, showing the opposite side from that shown in Fig. 2.

Fig. 6 is a diagrammatic plan view showing my improved loading device in its illustrative embodiment in loading position in a mine room.

Referring to the drawings and first to Fig. 6, a shaker drive mechanism is shown at 1. This may assume various forms, and may desirably be of the form which constitutes the subject matter of the application of Charles N. Bebinger, Serial No. 595,901, filed May 26, 1945, and since formally abandoned in view of the filing of continuation-in-part application, Serial No. 715,526, on December 11, 1946. This shaker drive mechanism moves a pan line 2 back and forth, outward—that is towards the point of discharge—with a relatively slow smooth movement, so that the material on the pans will move with the latter, and inward—towards the point from which material is to be moved—with a sharply accelerated movement, so that, due to the inertia of the material on the pans, the pans may slide inwardly under and relative to the material, with the result that each complete reciprocation of the pan line finds the material upon it displaced outwardly a certain distance—normally a matter of some inches.

A swivel connection 3 is provided in the pan line at a point sufficiently spaced from the body of material to be loaded out, to permit the requisite movement, laterally of the face, of my improved loading mechanism to be effected. Between this swivel connection and the face, there lie an extensible section 4 of the pan line and my improved loading head or pan, generally designated 5. By virtue of the swivel connection 3, the extensible section 4 and my improved loading head or pan 5 may be swung about the axis of the swivel to maintain a suitable relation to the material to be loaded, during the loading operation, and to position the loading mechanism so that it may be in desired position when loading is to be commenced.

The extensible section 4 includes two pan sections, 6 and 7, which are adapted to overlie one another and to be held together in their various overlapping positions by a series of clamp members 8, such as the well-known C clamps. By loosening these clamp members, the amount of overlap between the pan sections 6 and 7 may be adjusted, and, by tightening them, the pan sections may be held in their different positions of relative adjustment. By this arrangement, and by the addition, as needed, of further sections to the pan line 2, with relocation of the swivel 3, the loading head 5 may be relocated as the coal face recedes, so as to be maintained in desired relation to the face as mining out of the coal progresses. A shorter pan section 9 is arranged between the pan section 7 and the loading head or pan 5. Lateral feeding of the pan section 5 may be effected, as by means of a cable 10, an abutment jack 11, and cable winding mechanism, hand or power operated, diagrammatically designated at 12.

The structure of the loading head or pan 5 may be observed in Figs. 1 to 5 inclusive. In the preferred embodiment therein shown, this head or pan may be noted to comprise connecting means 15 for effecting connection, in the arrangement shown, to the short pan section 9, a collecting trough section 16, and what might be called a ramp section 17, the latter having at the end opposite the connecting means 15 a nose portion 18. The ramp section 17 is made up of the top plate section 19, the bottom plate section 20, a sloping rear plate section 21, reinforcing elements 22 and an armed edge section 23. The plate section 19 is shown as of a corrugated cross section on planes transverse to the length of the ramp section. As illustrated, the plate section 19 is provided with a plurality of relatively plane portions 25 separated by a plurality of convex portions 26 extending longitudinally of the ramp section and forming, as it were, longitudinal, rounded-top ribs extending throughout the length of the ramp section. The bottom section 20 is, as shown, at least approximately plane to facilitate its traverse of the mine floor, and the rear plate section 21 makes an obtuse angle with the bottom section 20. The reinforcing elements 22 are made of plate material having their upper edges sloping so as to support the sloping lower side of the plate 19, and may have one or more rounded projections 28 to fit into one or more of the recesses 29 provided beneath the rounded projections 26, and may also have plane portions 30 engageable with the relatively plane surfaces on the bottom of the corrugated plate 19 between the ribs on the latter. The several plate portions 19, 20 and 21 and the reinforcing elements 22 are all suitably welded together to make a relatively light but very rigid structure.

Herein shown as in line with each of the reinforcing plate sections 22, there are bit elements arming the pan along the edge thereof which is to be advanced as the pan moves laterally during loading. Herein blocks 32, equipped with pointed bits 33, are secured to the forward edge portion of the plate 20 and to a thickened reinforcing bar 34 as by rivets 35. The distance between the bit carrying blocks is desirably so chosen that during pan reciprocation the blocks and bits will level the bottom for the full length of the pan. The manner of bit mounting on the blocks, and of the block mounting on the pan, may be varied, but riveting, with or without brazing or welding may be employed, and brazing of the bits in holes in the blocks is an effective method of mounting the former. The reinforcing plate 34 may be secured by welding, and also by riveting common to the bit blocks, to the plate 20.

As the pan will normally be inserted in a kerf before shooting of the coal, so that the coal may be brought down upon it, the gauge of the plates making up the pan member will be chosen to secure adequate strength but to avoid excessive weight. By locating the bit blocks so that they will cumulatively maintain a level bottom throughout the full length of the pan as the latter is reciprocated and advanced and then spacing the reinforcing plates 22 in correspondence with the location of the bit blocks, a very strong construction will be provided. The nose piece 18 tapers from its receding end to its advancing end, and is disposed at an angle to the mine bottom, so that its upper surface 36 at one side contacts the mine bottom and at its other side extends along the various plane surfaces 25. If desired, a bottom plate may be used to lend additional rigidity to the nose member 18 and also a sloping rear plate in line with the plate element 21.

The other end of the loading head or pan 5 includes a chutelike portion 37, whose bottom 38 slopes, as shown in Figs. 2 and 5, upwardly from the level of the bottom of the plate section 20, and there is also a lateral taper between the sloping sides 39 and 40 of the connecting portion 16, so that, while material may be discharged from any point within the width of the upper corrugated surface of the ramp element into the wider end of the chute portion 37, the material will be brought together—collected—in such a manner as to pass smoothly into the mouth portion 42 (see Fig. 4) of the trough section 9 which is provided by the connecting section 15 of the loading head or pan 5. A so-called saddle member 43, having eyes 44 for securing bolts 45 for connecting the device 5 to the pan section 9, is shown arranged at the extreme right hand end of the pan or head 5 in Fig. 1. An ear 46, having an opening 47 for the connection of an attaching member 48 carried at the end of the cable 10 is arranged adjacent and welded to the saddle member 43; and an upstanding tapering wall 49 is arranged along the top of the side wall element 40 and the adjacent portion of the ramp section 17 to reduce the possibility of material escaping rearwardly during its shifting to enter the mouth portion 42. A reinforcing element 50 is secured as by welding at the receding side of the head or pan 5, and this may have an eye 51 to which a cable may be connected for pulling the head 5 over to the right hand rib if the operator doesn't desire to bar it back to that position. Suitable reinforcement plates 52 are secured to the bottom of the trough section 16.

According to a preferred method of use of my invention, the head or pan 5 is placed in a kerf before the coal is shot, generally being disposed as near one back end of the kerf as possible, and the pan is set in reciprocatory shaker motion before the shots are fired. Accordingly, when the coal falls, a considerable mass falls upon the ramp section 17 and more is ordinarily in a position to roll down on to it when the part which directly overlies it is loaded out. Thus while the smoke of shooting is clearing away from the working place, a substantial mass of coal is loaded out, several cars being fillable, in reasonably high coal, before the men return to the face. If the pan has cleared itself of coal before the operator again takes over the control, he simply operates the feeding means to bring the pan under the coal again, the bits and their mounting enabling the head or pan, when traction is exerted on it as by the cable 10, to work its way under the shot coal. When the pan is pretty well buried, it is caused to move at such a rate—or, better, in such steps—as will cause it to remain buried in a position for the coal to continue to fall upon it, until it reaches the other side of the undercut and shot coal. A helper cleans out the fines with a shovel and throws any small amount of coal that may get across the pan before it reaches and passes onto the trough line, back into position to be loaded out. When the operations have been completed after one undercutting and shooting, the mechanism may be returned to the side at which it started, and by releasing the clamps 8 on the extension pan and/or by adding a section in the pan line section 2 and changing the position of the swivel 3, the pan or head 5 may be placed in position for the next shooting. As the coal is loaded out, say from the right rib, the undercutter may be sumped in again, and the cutter can be caused to cross the face behind the pan or head 5, though with the setting of more jacks than will be needed with complete separation of the cutting and loading operations. It will be evident that I have provided a simple, strong and rugged loading attachment adapted effectively to work its way under the coal to prevent the escape of material over its rearward edge and to resist the crushing forces to which it will be subjected.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. A loading device for a shaker conveyor, comprising a longitudinally reciprocable, laterally feedable member having a ramp shaped portion disposed with the edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts, and said upper part provided with longitudinally extending corrugations, and means to attach said member to a shaker conveyor for longitudinal reciprocation by the latter.

2. A loading device for a shaker conveyor, comprising a longitudinally reciprocable, laterally feedable member having a ramp shaped portion disposed with the edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts, and said upper part provided with longitudinally extending corrugations, and means to attach said member to a shaker conveyor for longitudinal reciprocation by and lateral feed with the latter, said ramp shaped portion armed with bits along the advancing edge thereof.

3. A loading device for a shaker conveyor, comprising a longitudinally reciprocable, laterally feedable member having a ramp shaped portion disposed with the edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts, and said upper part provided with longitudinally extending corrugations, and means to attach said member to a shaker conveyor for longitudinal reciprocation by the latter, said ramp shaped portion having reinforcing plate elements extending transversely thereof and secured to the upper and bottom parts thereof.

4. A loading device for a shaker conveyor, comprising a longitudinally reciprocable, laterally feedable member having a ramp shaped portion disposed with the edge of the ramp at what is the advancing side of said member during its lateral feed and armed with bit elements, said ramp shaped portion including a generally horizontal bottom part by which it is wholly supported upon a surface from which material is to be loaded, a laterally inclined upper part and a part connecting the receding edges of said bottom and upper parts, and said upper part provided with longitudinally extending corrugations, and means to attach said member to a shaker conveyor for longitudinal reciprocation by and lateral feed with the latter, said ramp shaped portion having reinforcing plate elements extending transversely thereof and secured to the upper and bottom parts thereof, said reinforcing elements lying in the same transverse planes with the bit elements.

5. A loading device for a shaker conveyor, comprising a longitudinally reciprocable, laterally feedable member having a ramp shaped portion disposed with the edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts and said upper part provided with longitudinally extending corrugations, and means to attach said member to a shaker conveyor for longitudinal reciprocation by and lateral feed with the latter, said ramp shaped portion having at one end thereof a tapering trough section for connection to a pan line and at the other end thereof having a tapering nose portion having its end at the receding side of said member both higher and of greater extent longitudinally of said member than its advancing end.

6. A loading device for a shaker conveyor, comprising a longitudinally reciprocable, laterally feedable member having a ramp shaped portion disposed with the edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts and said upper part provided with longitudinally extending corrugations, and means to attach said member to a shaker conveyor for longitudinal reciprocation by the latter including a trough shaped section connected at one end to said ramp shaped section and tapering laterally towards its other end and having at the top of its receding side an intercepting wall for minimizing the escape of material from the upper edge of the trough shaped section.

7. A loading device for a shaker conveyor, comprising a longitudinally reciprocable, laterally feedable member having a ramp shaped portion disposed with the lower edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts, and said upper part provided with longitudinally extending corrugations, and means to attach said member to a shaker conveyor for longitudinal reciprocation by the latter including a trough shaped section connected at one end to said ramp shaped section and tapering laterally towards its other end and having at the top of its receding side an intercepting wall for minimizing the escape of material from the upper edge of the trough shaped section.

8. A loading device for a shaker conveyor, comprising a longitudinally reciprocable, laterally feedable member having a ramp shaped portion disposed with the edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts and said upper part provided with longitudinally extending corrugations, and means to attach said member to a shaker conveyor for longitudinal reciprocation by the latter including a tapering trough section provided with means for connecting lateral traction means to said member.

9. A loading device for a shaker conveyor, comprising a longitudinally reciprocable, laterally feedable member having a ramp shaped portion disposed with the edge of the ramp at what is the advancing side of said member during its lateral feed, said ramp shaped portion including a generally horizontal bottom part by which it is wholly supported upon a surface from which material is to be loaded, a laterally inclined upper part and a part connecting the receding edges of said bottom and upper parts and said upper part provided with longitudinally extending corrugations, and means to attach said member to a shaker conveyor for longitudinal reciprocation by the latter including a tapering trough section provided with means for connecting lateral traction means to said member and having a reinforcing element at its receding side welded to said third part and to its own rearward side.

10. A loading device for a shaker conveyor, comprising a longitudinally reciprocable member having in rigid relation to each other a laterally inclined top and a bottom underlying said top and reciprocating with the latter and forming a skid which in the use of such loading device directly slidably engages a surface from which material is to be loaded and constitutes the support for said member upon said surface, said member having respectively advancing and receding sides extending in the direction of longitudinal reciprocation of said member and, said top having between said sides a plurality of ridges and grooves extending in the direction of longitudinal reciprocation of said member, and means to attach said member to a shaker conveyor, said member having the top of each ridge after the one nearest the advancing side of said member higher than the one which is next nearer to such advancing side.

11. A loading device for a shaker conveyor, comprising a longitudinally reciprocable elongated member, wedge-shaped in transverse section and having a bottom fixed with respect to it and forming a skid on which it is wholly supported for reciprocation upon a surface from which material is to be loaded, said member also having a top and respectively advancing and receding sides extending in the direction of longitudinal reciprocation of said member and said top being inclined upwardly from said advancing towards said receding side and having between said sides, a plurality of alternating ridges and plane bottomed grooves extending in the direction of longitudinal reciprocation of said member, said member having the plane bottoms of its grooves in a plane inclined to the surface from which material is to be loaded, and the top of the ridge nearest the receding side constituting the high point in said loading device.

12. A side-feed loading head securable at the forward end of a longitudinally reciprocable trough and adapted to work its way beneath and to load out material when it is advanced in a direction transverse to its direction of reciprocation by the trough, said head comprising a corrugated plate having alternate ridges and grooves extending longitudinally of the trough in the direction of reciprocation and having bit members along the side edge of the plate which is the forward edge of the latter during transverse feed, said bit members extending outwardly from said edge at an angle to the direction of reciprocation, and a bottom plate to which said corrugated plate is rigidly secured along its forward edge and with which said corrugated plate forms a dihedral angle, said bottom plate engageable with a floor surface from which material is to be loaded, for supporting said corrugated plate with the bits at the forward side edge of the latter in contact with the floor surface from which material is to be gathered and the rearward side edge of the corrugated plate being spaced a substantial distance above said floor surface, means to effect reciprocation of said trough, and means for exerting a force to advance said head, in a direction transverse to the said forward side edge thereof, into a mass of material to be conveyed.

13. A loading device for a reciprocable shaker conveyor comprising a corrugated plate having the corrugations thereof in the form of ridges and grooves extending longitudinally of the plate in the direction of reciprocation, said plate having bit members along one longitudinal side of the latter extending outwardly therefrom at an angle to the direction of reciprocation, means underlying said plate for the greater portion of the width of the latter and reciprocable with the latter and supported flat and reciprocable upon a surface from which material is to be gathered, for maintaining said corrugated plate in a laterally inclined position with said bit members at the lower side of said plate and with each successive corrugation toward the receding side of said plate higher at its uppermost portion than the uppermost portion of the next preceding corrugation and the highest corrugation determining the height of said loading device, means for reciprocating said plate longitudinally, and means to force the bit equipped edge of said plate beneath material to be loaded.

14. A loading device for a shaker conveyor, comprising a longitudinally reciprocable, laterally feedable member having a ramp-shaped portion disposed with the edge of the ramp at what is the advancing side of said member during its lateral feed, said ramp-shaped portion including a generally horizontal bottom part by which it is wholly supported upon a surface from which material is to be loaded, a laterally inclined upper part and rigid connecting means between said bottom and laterally inclined upper part for maintaining them at a fixed angle to each other, and said upper part provided with longitudinally extending corrugations, and means to attach said member to a shaker conveyor for longitudinal reciprocation by the latter.

GEORGE BAECHLI.

REFERENCES CITED

The following references are of record in the file of this patent:

UNITED STATES PATENTS

| Number | Name | Date |
|---|---|---|
| 131,564 | Rowland | Sept. 24, 1872 |
| 1,757,810 | Newman et al. | May 6, 1930 |
| 1,971,292 | Brauer | Aug. 21, 1934 |
| 2,030,145 | McCarthy | Feb. 11, 1936 |
| 2,065,819 | McCarthy | Dec. 29, 1936 |
| 2,136,951 | Overstrom | Nov. 15, 1938 |
| 2,164,676 | Appleyard et al. | July 4, 1939 |
| 2,379,337 | Bergman | June 26, 1945 |
| 2,399,713 | Tibbals | May 7, 1946 |
| 2,410,561 | Bailey | Nov. 5, 1946 |

FOREIGN PATENTS

| Number | Country | Date |
|---|---|---|
| 188,349 | Great Britain | Nov. 1, 1922 |